United States Patent
Beerse et al.

(10) Patent No.: US 9,160,780 B2
(45) Date of Patent: *Oct. 13, 2015

(54) SYSTEM AND METHOD FOR ESTABLISHING A VOICE OVER IP SESSION

(75) Inventors: Chelsea Christine Beerse, Fairport, NY (US); Arno Denne, Coolock (IE); Patrick Joseph O'Sullivan, Ballsbridge (IE); Jeffrey B. Sloyer, Fishersville, VA (US)

(73) Assignee: International Business Machines Corporation, Armonk, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/341,221

(22) Filed: Dec. 30, 2011

(65) Prior Publication Data

US 2013/0170487 A1    Jul. 4, 2013

(51) Int. Cl.
*H04L 29/06* (2006.01)
*H04L 12/64* (2006.01)

(52) U.S. Cl.
CPC .......... *H04L 65/80* (2013.01); *H04L 12/6418* (2013.01); *H04L 65/1006* (2013.01); *H04L 65/1016* (2013.01); *H04L 65/1033* (2013.01)

(58) Field of Classification Search
CPC .......... H04L 12/6418; H04L 65/1006; H04L 65/1016; H04L 65/1033; H04L 65/1036; H04L 65/1069; H04L 65/80
USPC ................. 370/352, 356, 237, 401
See application file for complete search history.

(56) References Cited

U.S. PATENT DOCUMENTS

| | | | |
|---|---|---|---|
| 6,577,648 B1 | 6/2003 | Raisanen et al. | |
| 6,868,080 B1 | 3/2005 | Umansky et al. | |
| 2002/0051464 A1 | 5/2002 | Sin et al. | |
| 2003/0227907 A1 | 12/2003 | Choi et al. | |
| 2004/0205239 A1* | 10/2004 | Doshi et al. | 709/241 |
| 2005/0047579 A1* | 3/2005 | Salame | 379/265.09 |
| 2005/0111459 A1* | 5/2005 | Stampfl et al. | 370/395.2 |

(Continued)

FOREIGN PATENT DOCUMENTS

| | | |
|---|---|---|
| CA | 2656500 A1 | 1/2008 |
| CN | 1688142 | 10/2005 |

(Continued)

OTHER PUBLICATIONS

Wu, et al., "Design of QoS and Admission Control for VoIP Services Over IEEE 802.11e WLANs", Journal of Information Science and Engineering, 24, pp. 1003-1022 (2008).

(Continued)

*Primary Examiner* — Khaled Kassim
(74) *Attorney, Agent, or Firm* — Holland & Knight LLP; Brian J. Colandreo, Esq.; Jeffrey T. Placker, Esq.

(57) ABSTRACT

A method, computer program product, and computer system for establishing a Voice over IP (VoIP) session. One or more computing devices initiate the VoIP session between a plurality of devices. A first communication channel is established as an active channel for a first computing device of the plurality of devices, where the active channel is fully enabled for use by the first computing device. A second communication channel is established as a passive channel for the first computing device while maintaining the active channel, where the passive channel is at least partially enabled for use by the first computing device.

12 Claims, 3 Drawing Sheets

(56) References Cited

U.S. PATENT DOCUMENTS

| | | |
|---|---|---|
| 2006/0215601 A1 | 9/2006 | Vleugels et al. |
| 2007/0015536 A1* | 1/2007 | LaBauve et al. ............ 455/552.1 |
| 2007/0025264 A1 | 2/2007 | Cheng et al. |
| 2007/0058546 A1 | 3/2007 | Na |
| 2007/0171816 A1* | 7/2007 | Pfleging et al. ................ 370/225 |
| 2007/0183317 A1* | 8/2007 | Vasseur et al. ................ 370/225 |
| 2007/0280102 A1* | 12/2007 | Vasseur et al. ................ 370/225 |
| 2007/0291648 A1* | 12/2007 | Pfleging et al. ................ 370/237 |
| 2008/0222294 A1 | 9/2008 | Liang |
| 2008/0317011 A1* | 12/2008 | Datta et al. .................... 370/356 |
| 2009/0010224 A1* | 1/2009 | Attar et al. .................... 370/331 |
| 2009/0175193 A1* | 7/2009 | Shaffer et al. ................. 370/254 |
| 2010/0003988 A1 | 1/2010 | Buckley et al. |
| 2010/0091648 A1* | 4/2010 | Zhao ............................. 370/225 |
| 2011/0096675 A1* | 4/2011 | Li et al. ......................... 370/252 |
| 2011/0096762 A1* | 4/2011 | Basart ........................... 370/338 |
| 2011/0134892 A1* | 6/2011 | Shirakabe et al. ............. 370/336 |
| 2011/0149951 A1* | 6/2011 | Qiu et al. ....................... 370/352 |
| 2011/0252144 A1* | 10/2011 | Tung et al. .................... 709/227 |
| 2011/0268023 A1* | 11/2011 | Srinivasan et al. ............ 370/328 |
| 2012/0272053 A1* | 10/2012 | Brown et al. ................. 713/150 |
| 2012/0311329 A1* | 12/2012 | Medina et al. ................ 713/168 |
| 2012/0311686 A1* | 12/2012 | Medina et al. .................... 726/7 |

FOREIGN PATENT DOCUMENTS

| | | |
|---|---|---|
| CN | 101170539 | 4/2008 |
| EP | 1653673 A1 | 3/2006 |
| WO | 2006062907 A1 | 6/2006 |
| WO | 2009092008 A1 | 7/2009 |

OTHER PUBLICATIONS

International Search Report Dated Jan. 8, 2013 Received in International Application No. PCT/CA2012/050627, pp. 1-3.

* cited by examiner

SYSTEM AND METHOD FOR ESTABLISHING A VOICE OVER IP SESSION

TECHNICAL FIELD

This disclosure relates to communication systems and methods and, more particularly, to Voice over IP systems and methods.

BACKGROUND

Voice over IP (VoIP) generally involves the delivery of both data and voice communications over internet protocol (IP) networks, such as the internet. Many people use VoIP to replace their traditional telephone service which typically uses, e.g., circuit-switched public telephone networks. One disadvantage of using VoIP, however, is that communication on the IP networks does not guarantee the same reliability of the traditional circuit-switched public telephone networks. For example, VoIP may not typically ensure delivery of data packets or ensure the data packets are delivered in the correct order (i.e., sequentially). As a result, VoIP calls, for example, may suffer from less than optimal audio signal quality. Decreased signal quality can be cumbersome and frustrating for the end users, where the ability to understand the conversation is overly limited.

SUMMARY OF DISCLOSURE

In one implementation, a method for establishing a Voice over IP (VoIP) session, performed by one or more computing devices, comprises initiating, by the one or more computing devices, the VoIP session. A first communication channel is established as an active channel for a first computing device of the one or more computing devices, where the active channel is fully enabled for use by the first computing device. A second communication channel is established as a passive channel for the first computing device while maintaining the active channel, where the passive channel is at least partially enabled for use by the first computing device.

One or more of the following features may be included. At least partially enabling the passive channel for use by the first computing device may include partially priming the passive channel. The passive channel may be persistent.

The active channel may be monitored to detect signal quality during the VoIP session. It may be determined that a signal quality threshold level of the active channel is reached. In response to determining that the signal quality threshold level is reached, a failover process may be implemented to establish the passive channel as a new active channel for use by the first computing device. The failover process may be at least one of automatically implemented and manually implemented.

Implementing the failover process may include fully enabling use of the passive channel as the new active channel. Implementing the failover process may further include establishing the fully enabled passive channel as the new active channel for use by the first computing device. The active channel may be terminated. A third passive channel may be established that is at least partially enabled for use by the first computing device.

In another implementation, a computer program product resides on a computer readable medium that has a plurality of instructions stored on it. When executed by a processor, the instructions cause the processor to perform operations comprising initiating, by one or more computing devices, a Voice over IP (VoIP) session. A first communication channel is established as an active channel for a first computing device of the one or more computing devices, where the active channel is fully enabled for use by the first computing device. A second communication channel is established as a passive channel for the first computing device while maintaining the active channel, where the passive channel is at least partially enabled for use by the first computing device.

One or more of the following features may be included. At least partially enabling the passive channel for use by the first computing device may include partially priming the passive channel. The passive channel may be persistent.

The active channel may be monitored to detect signal quality during the VoIP session. It may be determined that a signal quality threshold level of the active channel is reached. In response to determining that the signal quality threshold level is reached, a failover process may be implemented to establish the passive channel as a new active channel for use by the first computing device. The failover process may be at least one of automatically implemented and manually implemented.

Implementing the failover process may include fully enabling use of the passive channel as the new active channel. Implementing the failover process may further include establishing the fully enabled passive channel as the new active channel for use by the first computing device. The active channel may be terminated. A third passive channel may be established that is at least partially enabled for use by the first computing device.

In another implementation, a computing system includes a processor and memory configured to perform operations comprising initiating, by one or more computing devices, a Voice over IP (VoIP) session. A first communication channel is established as an active channel for a first computing device of the one or more computing devices, where the active channel is fully enabled for use by the first computing device. A second communication channel is established as a passive channel for the first computing device while maintaining the active channel, where the passive channel is at least partially enabled for use by the first computing device.

One or more of the following features may be included. At least partially enabling the passive channel for use by the first computing device may include partially priming the passive channel. The passive channel may be persistent.

The active channel may be monitored to detect signal quality during the VoIP session. It may be determined that a signal quality threshold level of the active channel is reached. In response to determining that the signal quality threshold level is reached, a failover process may be implemented to establish the passive channel as a new active channel for use by the first computing device. The failover process may be at least one of automatically implemented and manually implemented.

Implementing the failover process may include fully enabling use of the passive channel as the new active channel. Implementing the failover process may further include establishing the fully enabled passive channel as the new active channel for use by the first computing device. The active channel may be terminated. A third passive channel may be established that is at least partially enabled for use by the first computing device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
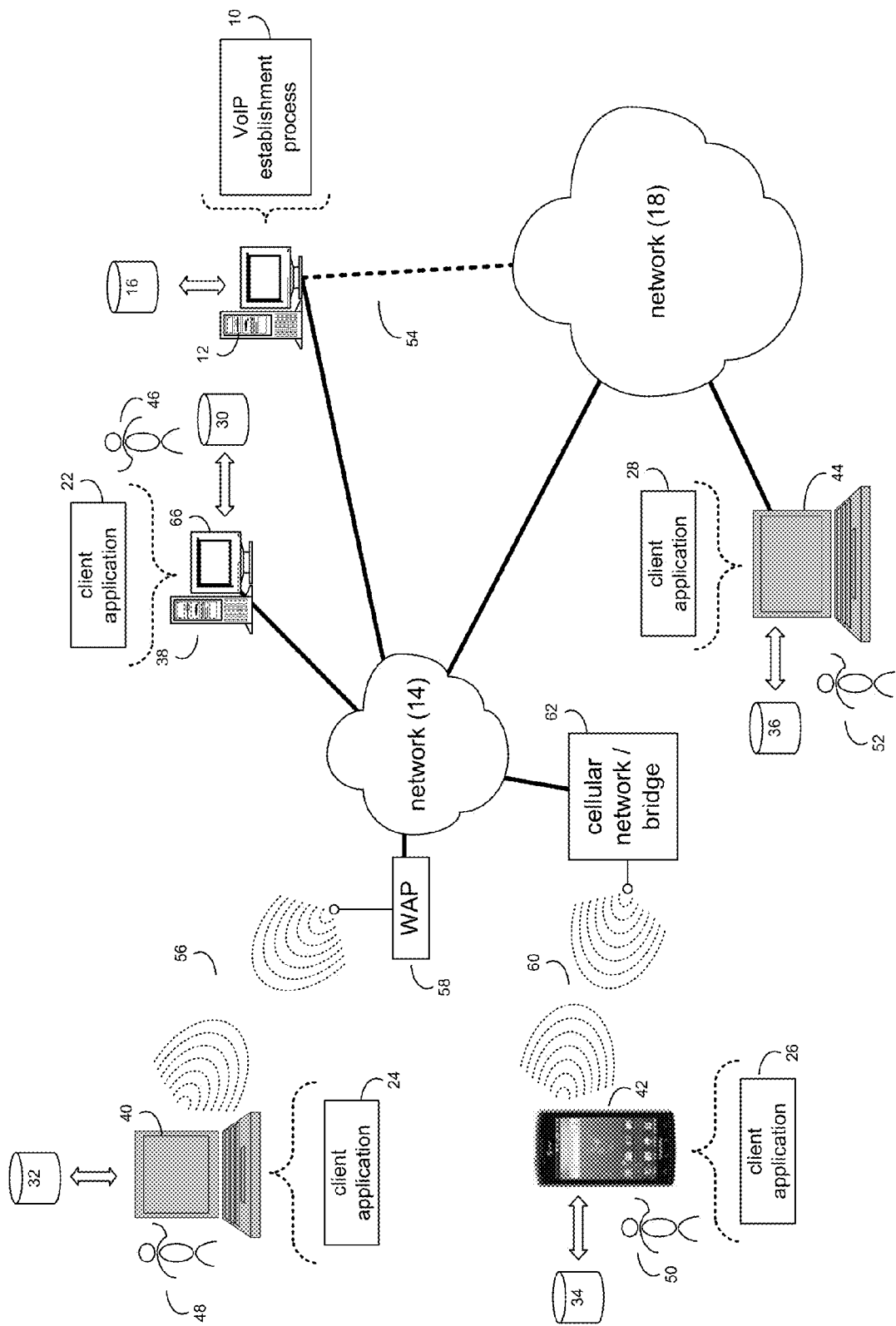
FIG. 1 is an illustrative diagrammatic view of a VoIP establishment process coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown VoIP establishment process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a tablet computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, VoIP establishment process 10 may comprise initiating, by one or more computing devices, a Voice over IP (VoIP). A first communication channel is established as an active channel for a first computing device of the one or more computing devices, where the active channel is fully enabled for use by the first computing device. A second communication channel is established as a passive channel for the first computing device while maintaining the active channel, where the passive channel is at least partially enabled for use by the first computing device.

The instruction sets and subroutines of VoIP establishment process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

VoIP establishment process 10 may be accessed via client applications 22, 24, 26, 28. Examples of client applications 22, 24, 26, 28 may include but are not limited to a standard web browser, email client application, a customized web browser, instant messaging client, softphone client, unified messaging client, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), and a dedicated network device (not shown).

One or more of client applications 22, 24, 26, 28 may be configured to effectuate some or all of the functionality of VoIP establishment process 10. Accordingly, VoIP establishment process 10 may be a purely server-side application, a purely client-side application, or a hybrid server-side/client-side application that is cooperatively executed by one or more of client applications 22, 24, 26, 28 and VoIP establishment process 10.

Users 46, 48, 50, 52 may access computer 12 and VoIP establishment process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows, e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

Figure 2:
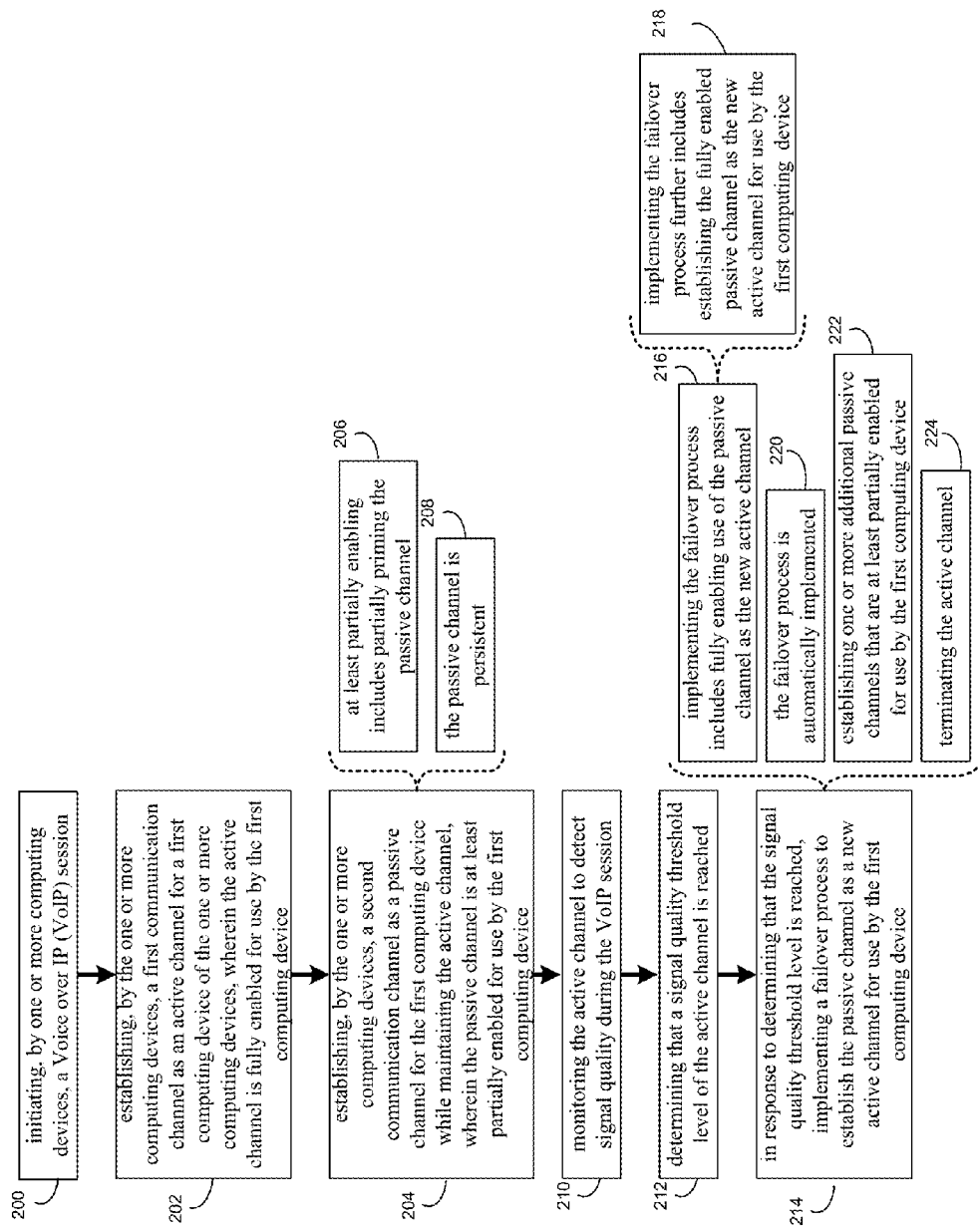
FIG. 2 is an illustrative flowchart of the VoIP establishment process of FIG. 1.
Figure 3:
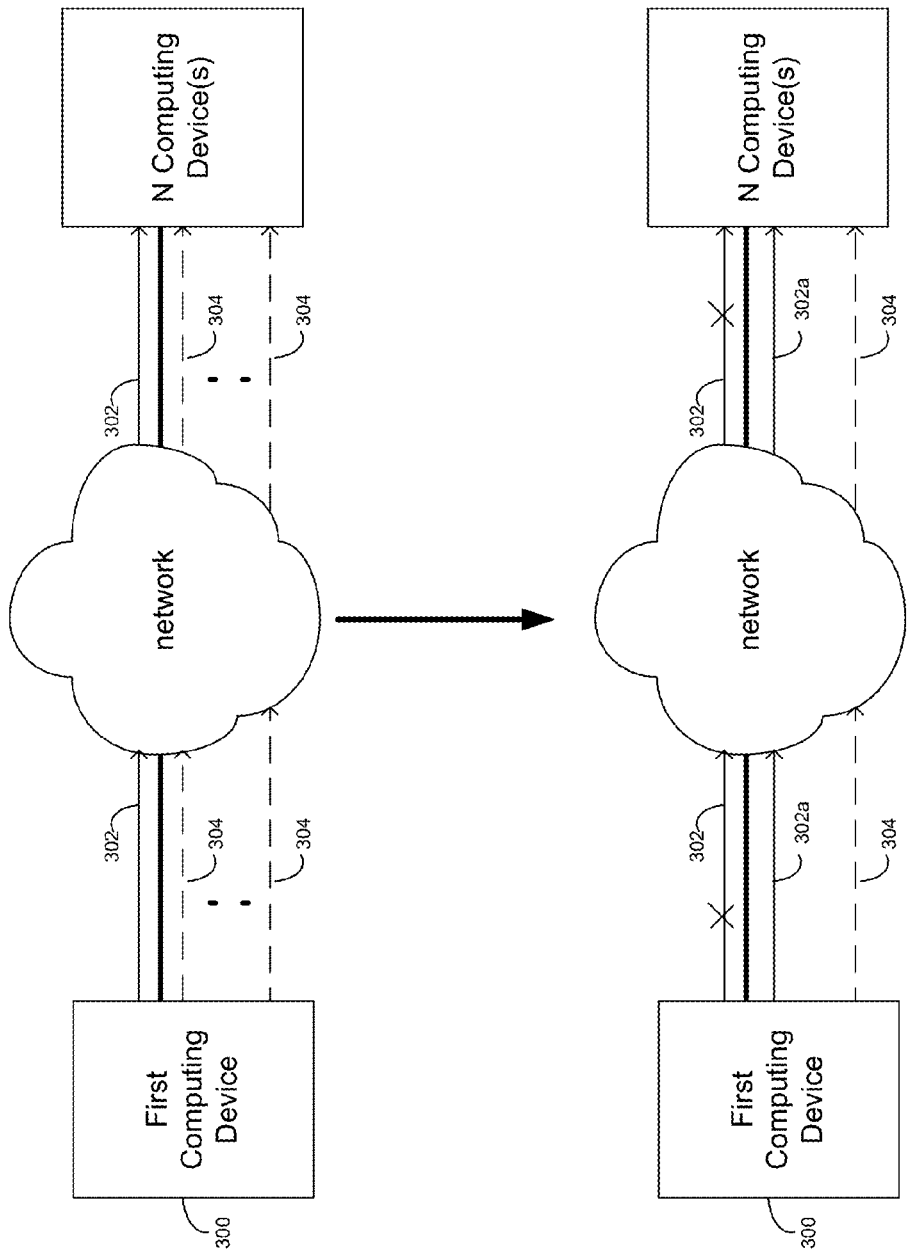
FIG. 3 is an illustrative diagrammatic view of a screen image displayed by the VoIP establishment process of FIG. 1.

The VoIP Establishment Process:

As discussed above and referring also to FIGS. 2-3, VoIP establishment process 10 may initiate 200, by one or more computing devices, a Voice over IP (VoIP) session. A first communication channel may be established 202 as an active channel 302 for a first computing device 300 of the one or more computing devices, where the active channel 302 may be fully enabled for use by the first computing device 300. A second communication channel may be established 204 as a passive channel 304 for the first computing device 300 while maintaining the active channel 302, where the passive channel 304 may be at least partially enabled for use by the first computing device 300.

VoIP establishment process 10 may initiate 200 the VoIP session (e.g., an online meeting, unified telephony Session Initiated Protocol (SIP) based communication, etc.), using standard techniques known to those skilled in the art. Illustratively, the one or more computing devices may include, for example, computer 12, one or more client electronic devices 38, 40, 42, 44, broadband modem (not shown), phone adapter (not shown), router (not shown), or other computing device that may be involved in establishing the VoIP session.

According to one or more embodiments of the disclosure, two channels for each user on a, e.g., unified telephony call session, may be established. For example, a first communication channel may be established 202 as an active channel 302 for a first computing device 300 of the one or more computing devices. Active channel 302 may be considered the conventional channel each user may occupy during the actual session. Thus, active channel 302 may be considered fully enabled (i.e., fully primed for immediate use) by the first computing device 300. That is, as is known to those skilled in the art, multiple steps (e.g., jump start logic, authentication, negotiation, information gathering, etc.) are generally required to admit a user into the VoIP session conversation, e.g., on a particular channel. Each of these steps may take time. Illustratively, when all steps have been completed the channel may be considered active. Therefore, active channel 302 may be considered as having performed all necessary steps (in no particular order) and be in use for the VoIP session (e.g., capable of communicating data of the VoIP session).

According to one or more illustrative embodiments, a second communication channel may be established 204 as a passive channel 304 for the first computing device 300. Illustratively, passive channel 304 may be established 204 at the start (i.e., initiation 200) of the VoIP session. However, those skilled in the art will appreciate that passive channel 304 may be established 204 any time after the start of the VoIP session. According to one or more illustrative embodiments, passive channel 304 is established before it is determined 212 that a signal quality threshold level is reached (discussed further below). Notably, passive channel 304 is also established 204 while active channel 302 is being maintained. That is, both active channel 302 and passive channel 304 are at some point simultaneously maintained. Illustratively, passive channel 304 may be persistently established 208 with active channel 302.

According to the illustrative embodiment, passive channel 304 may be at least partially enabled for use by the first computing device 300. Partially enabling passive channel 304 for use by the first computing device 300 may include partially priming 206 the passive channel. For example, passive channel 304 may have completed one or more of the steps required to admit a user into the VoIP session conversation, such as obtaining information needed to route audio to a server and establish a connection, but also may have not completed one or more of the steps. Thus, passive channel 304 may be considered a separate standby channel, which in contrast with active channel 302, has completed less than all the steps (and/or information gathering) required to admit the user into the VoIP session conversation. Passive channel 304 may remain on standby, e.g., not capable of communicating data of the VoIP session, until needed, as discussed in greater detail below. Illustratively, each channel (e.g., active channel 302 and passive channel 304 pair) may be a dedicated private line point to point connection path to each user and may be unique to each user.

According to one illustrative embodiment, passive channel 304 may have completed all necessary steps except for the actual admission of the user into the VoIP session conversation. Alternatively, passive channel 304 may have completed only a portion of the necessary steps required to admit the user into the VoIP session conversation. However, those skilled in the art will recognize that any number of steps or portions thereof may be completed and/or incomplete. As such, the description of any particular number of steps being completed and/or incomplete by passive channel 304 should be taken as an example only and not to otherwise limit the scope of the disclosure.

According to one or more alternative embodiments, at least a third passive channel may be established 222 that is at least partially enabled for use by the first computing device 300. Each partially enabled passive channel may have completed differing levels of enablement. For example, if there are two passive channels being concurrently maintained with active channel 202, one of the two passive channels may have only completed two steps required to admit the user into the VoIP session conversation, whereas the other passive channel may have completed three or more steps required to admit the user into the VoIP session conversation.

According to one or more embodiments, active channel 302 may be monitored 210 to detect signal quality during the VoIP session. Signal quality may be affected by, e.g., noise, which may include, e.g., echo, background noise, impedance, attenuation, interference, stochastic noise, consistent noise, high pitch, low pitch, crackling, and other forms of nose. Illustratively, active channel 302 may be monitored 210 on the server; however, those skilled in the art will appreciate that monitoring 210 (and/or other portions of VoIP establishment process 10) may be executed on the client side, an intermediary device, or a combination thereof.

It may be determined 212 that a signal quality threshold level (e.g., noise level) of active channel 202 is reached, e.g., during the VoIP session. The signal quality threshold level may be a preset level and/or may be changeably defined by, e.g., an end user, administrator, rules, or the like. Advantageously, this may allow for varying signal quality threshold levels on a per user and/or per communication basis. For example, one user on the VoIP session may have a lower signal quality threshold level, whereas another user on the same VoIP session may have a higher signal quality threshold level.

In response to determining that the signal quality threshold level is reached, a failover process may be implemented 214 to establish second (i.e., passive) channel 204 as a new active channel 302a for use by the first computing device 300. According to one or more illustrative embodiments, implementing 214 the failover process may include fully enabling 216 use of passive channel 204 as the new active channel 302a. For instance, this may include completing the additional remaining steps for passive channel 204 required to admit the user into the VoIP session conversation, e.g., on the new active channel 302a. Implementing 214 the failover process may further include establishing 218 the fully enabled passive channel as the new active channel 302a for use by the first computing device 300.

As noted above, each step toward full enablement to admit the user into the VoIP session conversation may take time. Advantageously, as passive channel 204 may have already been pre-established (i.e., completed one or more of the required steps) prior to having determined 212 that the signal quality threshold level (e.g., noise level) of active channel 202 is reached, transitioning passive channel 204 to the new active channel 302a may be accomplished rapidly in the act of the failover process in real time, without interruption, and transparently to the user. Illustratively, another passive channel may then be established should it be determined that the signal quality threshold level is reached for the new active channel 302a.

According to one or more illustrative embodiments, the failover process may be automatically implemented 220 (e.g., on a server side, client side, intermediate device side, hybrid side embodiment, or combination thereof), and/or manually implemented by, e.g., end user(s), moderator(s), administrator(s), etc. The previous active channel (i.e., active channel 202) may, but need not be terminated 224 (e.g., dismissed), e.g., after establishing 218 the fully enabled passive channel as the new active channel 302a for use by the first computing device 300.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and combinations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications and/or combinations of embodiments as are suited to the particular use contemplated.

Having thus described the disclosure of the present application in detail and by reference to embodiments thereof, it will be apparent that modifications, variations, and combinations are possible without departing from the scope of the disclosure defined in the appended claims.

What is claimed is:

1. A computer program product residing on a non-transitory computer readable medium having a plurality of instructions stored thereon which, when executed by a processor, cause the processor to perform operations comprising:
   initiating, by one or more computing devices, a Voice over IP (VoIP) session;
   establishing, by the one or more computing devices, a first VoIP communication channel as an active channel for a first computing device of the one or more computing devices, wherein the active channel is fully enabled for use by the first computing device including completing a plurality of steps required to admit the first computing device into the VoIP session;
   establishing, by the one or more computing devices, a second VoIP' communication channel as a passive channel for the first computing device while maintaining the active channel, wherein the passive channel is partially enabled for use by the first computing device including completing a portion of the plurality of steps required to admit the first computing device into the VoIP session;
   establishing, by the one or more computing devices, a third VoIP communication channel as a second passive channel for the first computing device while maintaining the active channel, wherein the second passive channel is partially enabled for use by the first computing device including completing a portion of the plurality of steps required to admit the first computing device into the VoIP session, wherein the second VoIP channel and the third VoIP channel are completed to different levels of enablement that the portion of the plurality of steps completed by the second VoIP passive channel is different than the portion of plurality of steps completed by the third VoIP passive channel;
   monitoring the active channel to detect signal quality on a per user basis during the VoIP session, the signal quality based upon a noise level associated with each user;
   determining that a signal quality threshold level of the active channel is reached; and
   in response to determining that the signal quality threshold level is reached, implementing a failover process to establish the passive channel as a new active channel for use by the first computing device, wherein implementing the failover process includes fully enabling use of the passive channel as the new active channel including completing additional remaining steps for the passive channel required to admit the user into the VoIP session on the new active channel.

2. The computer program product of claim 1 wherein partially enabling the passive channel for use by the first computing device includes partially priming the passive channel.

3. The computer program product of claim 1 wherein the passive channel is persistent.

4. The computer program product of claim 1 wherein implementing the failover process further includes establishing the fully enabled passive channel as the new active channel for use by the first computing device.

5. The computer program product of claim 1 wherein the failover process is at least one of automatically implemented and manually implemented.

6. The computer program product of claim 1 further comprising establishing a third communication channel as a new passive channel that is at least partially enabled for use by the first computing device.

7. The computer program product of claim 1 further comprising terminating the active channel.

8. A computing system including a processor and memory configured to perform operations comprising:
   initiating, by one or more computing devices, a Voice over IP (VoIP) session;
   establishing, by the one or more computing devices, a first VoIP communication channel as an active channel for a first computing device of the one or more computing devices, wherein the active channel is fully enabled for use by the first computing device including completing a plurality of steps required to admit the first computing device into the VoIP session;
   establishing, by the one or more computing devices, a second VoIP' communication channel as a passive channel for the first computing device while maintaining the active channel, wherein the passive channel is partially enabled for use by the first computing device including completing a portion of the plurality of steps required to admit the first computing device into the VoIP session;
   establishing, by the one or more computing devices, a third VoIP communication channel as a second passive channel for the first computing device while maintaining the active channel, wherein the second passive channel is partially enabled for use by the first computing device including completing a portion of the plurality of steps required to admit the first computing device into the VoIP session, wherein the second VoIP channel and the third VoIP channel are completed to different levels of enablement that the portion of the plurality of steps completed by the second VoIP passive channel is different than the portion of plurality of steps completed by the third VoIP passive channel;
   monitoring the active channel to detect signal quality on a per user basis during the VoIP session, the signal quality based upon a noise level associated with each user;
   determining that a signal quality threshold level of the active channel is reached; and
   in response to determining that the signal quality threshold level is reached, implementing a failover process to establish the passive channel as a new active channel for use by the first computing device, wherein implementing the failover process includes fully enabling use of the passive channel as the new active channel including completing additional remaining steps for the passive channel required to admit the user into the VoIP session on the new active channel.

9. The computing system of claim 8 wherein partially enabling the passive channel for use by the first computing device includes partially priming the passive channel.

10. The computing system of claim 8 wherein the passive channel is persistent.

11. The computing system of claim 8 further comprising establishing a third communication channel as a new passive channel that is at least partially enabled for use by the first computing device.

12. The computing system of claim 8 further comprising terminating the active channel.

\* \* \* \* \*